United States Patent
Hansen

(10) Patent No.: US 9,258,274 B2
(45) Date of Patent: Feb. 9, 2016

(54) USING INDIVIDUALIZED APIS TO BLOCK AUTOMATED ATTACKS ON NATIVE APPS AND/OR PURPOSELY EXPOSED APIS

(71) Applicant: Shape Security, Inc., Palo Alto, CA (US)

(72) Inventor: Marc Hansen, Mountain View, CA (US)

(73) Assignee: SHAPE SECURITY, INC., Palo Alto, CA (US)

( * ) Notice: Subject to any disclaimer, the term of this patent is extended or adjusted under 35 U.S.C. 154(b) by 0 days.

(21) Appl. No.: 14/327,461

(22) Filed: Jul. 9, 2014

(65) Prior Publication Data

US 2016/0014076 A1  Jan. 14, 2016

(51) Int. Cl.
*H04L 29/06* (2006.01)

(52) U.S. Cl.
CPC ...................... *H04L 63/02* (2013.01)

(58) Field of Classification Search
CPC ... H04L 41/042; H04L 63/00; H04L 63/1416; G06F 17/30029
See application file for complete search history.

(56) References Cited

U.S. PATENT DOCUMENTS

| | | | |
|---|---|---|---|
| 5,828,833 A | | 10/1998 | Belville et al. |
| 5,974,549 A | * | 10/1999 | Golan ............................ 726/23 |
| 6,161,185 A | * | 12/2000 | Guthrie et al. ..................... 726/5 |
| 7,117,429 B2 | | 10/2006 | Vedullapalli et al. |
| 7,334,254 B1 | * | 2/2008 | Boydstun et al. ................. 726/2 |
| 7,346,930 B1 | | 3/2008 | Boydstun et al. |
| 7,500,099 B1 | | 3/2009 | McElwee et al. |
| 7,707,223 B2 | | 4/2010 | Zubenko et al. |
| 7,913,300 B1 | * | 3/2011 | Flank et al. ..................... 726/12 |
| 8,020,193 B2 | | 9/2011 | Bhola et al. |
| 8,225,401 B2 | * | 7/2012 | Sobel et al. ..................... 726/23 |

(Continued)

FOREIGN PATENT DOCUMENTS

EP   2013/091709   6/2013
WO   99/64967      12/1999

(Continued)

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: URL:http://web.archive.org/web/20130623080604/http://weis2012.econinfosec.org/papers/Anderson_WEIS2012.pdf>, 31 pages, Jun. 2012.

(Continued)

*Primary Examiner* — Jeffery Williams
*Assistant Examiner* — Christopher C Harris
(74) *Attorney, Agent, or Firm* — Davis Wright Tremaine LLP; Philip H. Albert

(57) ABSTRACT

An API call filtering system filters responses to API call requests received, via a network, from user devices. The API call filtering system is configured to require personalized API call requests wherein each API call (except for some minor exceptions) includes a unique endpoint identifier ("UEID") of the user device making the request. Using the UEID, the web service or other service protected by the API call filtering system can be secured against excessive request iterations from a set of rogue user devices while allowing for ordinary volumes of requests of requests the user devices, wherein one or more boundaries between what is deemed to be an ordinary volume of requests and what is deemed to be excessive request iterations are determined by predetermined criteria.

22 Claims, 6 Drawing Sheets

(56) References Cited

U.S. PATENT DOCUMENTS

| | | | |
|---|---|---|---|
| 8,332,952 B2 | | 12/2012 | Zhang et al. |
| 8,527,774 B2 | | 9/2013 | Fallows et al. |
| 8,533,480 B2 | | 9/2013 | Pravetz et al. |
| 8,590,014 B1 | * | 11/2013 | Haugsnes ............... 726/3 |
| 8,775,618 B2 | * | 7/2014 | Razzaq et al. .......... 709/225 |
| 8,782,744 B1 | * | 7/2014 | Fuller et al. ............. 726/3 |
| 2002/0088951 A1 | | 7/2002 | Chen |
| 2002/0099827 A1 | * | 7/2002 | Shah et al. ............. 709/227 |
| 2004/0237071 A1 | | 11/2004 | Hollander et al. |
| 2004/0245525 A1 | | 12/2004 | Yamazaki et al. |
| 2005/0165902 A1 | | 7/2005 | Hellenthal et al. |
| 2006/0095968 A1 | | 5/2006 | Portolani et al. |
| 2007/0011295 A1 | | 1/2007 | Hansen |
| 2007/0276950 A1 | | 11/2007 | Dadhia |
| 2008/0031447 A1 | | 2/2008 | Geshwind et al. |
| 2008/0098463 A1 | * | 4/2008 | Wikman ............... 726/5 |
| 2008/0222736 A1 | | 9/2008 | Boodaei et al. |
| 2008/0244078 A1 | | 10/2008 | Viljoen et al. |
| 2009/0013407 A1 | * | 1/2009 | Doctor et al. ........... 726/23 |
| 2009/0099988 A1 | | 4/2009 | Stokes et al. |
| 2009/0144829 A1 | | 6/2009 | Grigsby et al. |
| 2009/0158430 A1 | | 6/2009 | Borders |
| 2009/0193497 A1 | | 7/2009 | Kikuchi et al. |
| 2010/0191962 A1 | * | 7/2010 | Yan et al. ............... 713/165 |
| 2010/0235637 A1 | | 9/2010 | Lu et al. |
| 2010/0235910 A1 | | 9/2010 | Ku et al. |
| 2010/0257354 A1 | | 10/2010 | Johnston et al. |
| 2011/0131416 A1 | | 6/2011 | Schneider |
| 2011/0154021 A1 | | 6/2011 | McCann et al. |
| 2011/0289566 A1 | * | 11/2011 | Resch et al. .......... 726/6 |
| 2011/0296391 A1 | | 12/2011 | Gass et al. |
| 2012/0011262 A1 | | 1/2012 | Cheng et al. |
| 2012/0022942 A1 | | 1/2012 | Holloway et al. |
| 2012/0131354 A1 | | 5/2012 | French |
| 2012/0180021 A1 | | 7/2012 | Byrd et al. |
| 2012/0216242 A1 | | 8/2012 | Uner et al. |
| 2012/0240211 A1 | * | 9/2012 | Counterman ........... 726/9 |
| 2012/0246722 A1 | | 9/2012 | Boney |
| 2013/0055287 A1 | * | 2/2013 | Pope et al. ............. 719/314 |
| 2013/0086669 A1 | * | 4/2013 | Sondhi et al. .......... 726/8 |
| 2013/0139235 A1 | * | 5/2013 | Counterman ........... 726/7 |
| 2013/0205019 A1 | | 8/2013 | Oellermann |
| 2013/0212603 A1 | * | 8/2013 | Cooke et al. ........... 719/328 |
| 2013/0263264 A1 | | 10/2013 | Klein et al. |
| 2014/0040787 A1 | | 2/2014 | Mills et al. |
| 2014/0123242 A1 | * | 5/2014 | Sprunk et al. .......... 726/4 |
| 2014/0237594 A1 | | 8/2014 | Thakadu et al. |

FOREIGN PATENT DOCUMENTS

| | | |
|---|---|---|
| WO | 2004/109532 | 12/2004 |
| WO | 2008/095018 | 8/2008 |
| WO | 2008/095031 | 8/2008 |
| WO | 2008/130946 | 10/2008 |

OTHER PUBLICATIONS

CodeSealer, "CodeSealer," codesealer.com [online] 2013 [captured Aug. 29, 2013]. Retrieved from the Internet:< URL:http://web.archivwe.org/web/20130829165031/http://codesealer.com/technology.html,> 2 pages.

Cova et al., "Detection and Analysis of Drive-by-Download Attacks and Malicious JavaScript Code," World Wide Web Conference Committee, Apr. 26-30, 2010. Retrieved from the Internet <URL: http://www.cs.ucsb.edu/~vigna/publications /2010_cova_kruegel_vigna_Wepawet.pdf>, 10 pages.

Currie et al., "In-the-wire authentication: Protecting client-side critical data fields in secure network transactions," $2^{nd}$ International Conference on Adaptive Science and Technology, 2009, pp. 232-237.

Dougan et al., "Man in the browser attacks," International Journal of Ambient Computing and Intelligence, Jan.-Mar. 2012, pp. 29-39.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclagb.tuwien.ac.at/papers/driveby.pdf>, 19 pages, 2009.

Entrust, "Defeating Man-in the Browser Malware," Entrust.com [online] Sep. 2012 [retrieved Oct. 15, 2013]. Retrieved from the Internet: <URL: http//download.entrust.com/resources/download.cfm/24002/>, 18 pages.

Marcus and Sherstobitoff, "Dissecting Operation High Roller," McAfee [online] 2012 [retrieved on Oct. 15, 2013]. Retrieved from the Internet <URL: http//www.mcafee.com/us/resources/reports/rpoperations-high-roller.pdf>, 20 pages.

Oh, "Recent Java exploitation trends and malware," Black Hat USA 2012, Retrieved from the Internet; <URL: https://media.blackhat.com/bh-us-12/Briefings/Oh/GBH_US_12_Oh_Recent_Java_Exploitation_Trends -and_Malware_WP.pdf>, 27 pages.

RSA, "RSE Offers Advanced Solutions to Help Combat Man-In-The_Browser Attacks," rsa.com [online] May 18, 201 [captured Nov. 11, 2011]. Retrieved from the Internet: <URL: http//web.archive.org/web/20111111123108/http//rsa.com/press_release.aspx?id=10943>, 3 pages.

Rutkowska, "Rootkits vs. Stealth by Design Malware," Black Hat Europe, 2006. Retrieved from the Internet: <URL: http//www.black.com/presenations/bh-europe-06/bh-eu-06-Rutkowska.pdf> 44 pages.

SafeNet, "Prevent Financial Fraud and Man-in-the-Browser Attacks," safenet-inc.com [online] retrieved on Oct. 15, 2013]. Retrieved from the Internet: <URL: http//www.safenet-inc.com/solutions/data-protection/financial-servicers/financial-fraud-man-in-the-browser-attacks/>, 1 page.

Sood and Enbody,"A Browser Malware Taxonomy," *Virus Bulletin*, Jun. 2011. Retrieved from the Internet: <URL: http://www.secniche.org/released/VB_BRW_MAL_TAX_AKS_RJE.pdf> 5 pages.

Sood and Enbody, "Browser Exploit Packs—Exploitation Tactics," Virus Bulletin Conference, Oct. 2011, Retrieved from the Internet: <URL: http//www.secniche.org/released/VB_BRW_MAL_TAX_AKS_RJE.pdf> 9 pages.

Sood et al., "The Art of Stealing Banking Information—Form grabbing on Fire," *Virus Bulletin*, Nov. 2011, Retrieved from the Internet: <URL: http//www.virusbtn.com/virusbulletin/archive/2011/11/vb201111-form-grabbing> 5 pages.

Team Cymru, "Cybercrime—an Epidemic," Queue, 4(9):24-35, Nov. 2006, Retrieved from the Internet: <URL: http//grygstad.rice.iit.edu:8000/Articles/Cybercrime%20-%20An%20Epidemic%20-%20ACM%20Queue.pdf> 3 pages.

Trusteer, "Trusteer Rapport for Online Banking," [online] 2013 [captured May 11, 2013]. Retrieved from the Interenet: <URL: http//web.archive.org/web/20130511162210/http://www.trusteer.com/products/trusteer-rapport-for-online-banking>, 2 pages.

Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.

Krebs on Security, In-depth security news and investigation, "A Closer Look at Rapport from Trusteer", dated Apr. 29, 2010.

Hofmeyr et al., "Intrusion Detection Using Sequences of System Calls," Journal of Computer Security, dated Aug. 18, 1998, retrieved Apr. 6, 2015 from the internet: https://www.cs.unm.edu/~forrest/publications/jcs-sequences-of-system-calls-98.pdf, pp. 151-180.

International Search Report and Written Opinion issued in International Patent Application No. PCT/US2015/039762, mailed Oct. 23, 2015, 10 pages.

\* cited by examiner

USING INDIVIDUALIZED APIS TO BLOCK AUTOMATED ATTACKS ON NATIVE APPS AND/OR PURPOSELY EXPOSED APIS

FIELD OF THE INVENTION

The present invention relates generally to network computer system security and more particularly to defense against some automated attacks on the network computer system.

BACKGROUND

The Internet (and related networks) can be used to send e-mails, conduct business, automate machinery and data processing. Connected users can use the Internet to interact with other connected users and/or connected computer systems. Some of the Internet traffic is wanted by the parties involved, but other traffic is unwanted by at least one party. For example, by some estimates, more than three quarters of daily e-mail volume over the Internet is unwanted by its targeted recipient (sometimes referred to as "spam"). More than just e-mail traffic is unwanted by its targeted recipient. For example, banks, bank customers, and bank network operators and managers do not want traffic that is attempting to manipulate the bank's online banking system to facilitate fraud. Of course, in today's world, there is some traffic that is wanted and/or necessary, so one task that online systems operators have to deal with is separating the wanted traffic from the unwanted traffic, letting the wanted traffic through and blocking the unwanted traffic.

For example, the typical e-mail recipient does not want to receive all unsolicited commercial offers. The online network operator that limits access to resources to authorized users does not want to receive traffic from unauthorized users. Unfortunately, the initiators of such unwanted traffic really want to send it, and will attempt to do so even if it requires getting around limits and controls placed by the online network operator. This creates an "arms race" between the initiators of unwanted traffic and the online network/systems operator.

There are many reasons a sender of unwanted traffic might want to initiate the traffic. Often, those are financial reasons. For example, if a scammer can send out one million e-mails with a total expenditure of less than ten dollars and a half hour of time, and reap a few dollars in profits from just 0.01% of the e-mail recipients, it is cost-effective for the scammer to do so. If an criminal organization can apply 100,000 username-password pairs to an e-commerce website to find the 0.01% that are vulnerable, they would do so if the monetary returns from hacking ten user accounts is greater than the cost to the criminal organization of obtaining the username-password pairs plus the cost of executing 100,000 attempted logins.

These unwanted attacks could be thwarted using guaranteed secure methods to filter out unwanted/unauthorized traffic from wanted/authorized traffic. However, as illustrated from the examples above, even a 99.99% success rate at blocking attacks would still allow enough traffic through to be a cost-effective attack. Some of this economics comes about because automation lowers the cost of transactions. Ironically, the very automation that makes it economically feasible for a bank, retailer, music distributor, online storage vendor, etc. to provide a low-cost service to millions of its customers also makes it economically feasible for a criminal or criminal organization to make millions of attempts to get at network resources in an unauthorized way.

If the effort required to mount an attack on a network resource can be raised so that it is uneconomical to attack (but still easy enough for authorized users to access), the attacks might be reduced. Therefore, it would be desirable to increase the efforts/costs of access to the network resource in a way that makes it uneconomical for an organization to mount an attack on network resources, while allowing authorized uses.

SUMMARY OF THE EMBODIMENTS

An API call filtering system filters responses to API call requests received, via a network, from user devices. The API call filtering system is configured to require personalized API call requests wherein each API call (except for some minor exceptions) includes a unique endpoint identifier ("UEID") of the user device making the request. Using the UEID, the web service or other service protected by the API call filtering system can be secured against excessive request iterations from a set of rogue user devices while allowing for ordinary volumes of requests of requests the user devices, wherein one or more boundaries between what is deemed to be an ordinary volume of requests and what is deemed to be excessive request iterations are determined by predetermined criteria.

The user device can be an endpoint device that executes endpoint apps, at least one of which sends requests via a network to a server or service that has been secured against excessive request iterations from a set of rogue user devices while allowing for ordinary volumes of requests from user devices. Those requests are first processed by the API call filtering system. An example user device might comprise an app initiator that processes data about, by, or for the user device, storage for one or more UEIDs, wherein at least one UEID is associated with the user device, and a request generator, that generates requests to be sent over the network to the service while identifying the user device in the requests.

Requests from user devices might include requests to authenticate the user device with respect to a secured account maintained at or for the API call filtering system. Verification might be performed by having end user devices generate a PKI key pair, sending the public key portion of the key pair to the API call filtering system, thereby allowing the API call filtering system to verify a UEID by sending a challenge message to the user device and receiving in return a signed message indicative of a case where the user device has a specific UEID.

The following detailed description together with the accompanying drawings will provide a better understanding of the nature and advantages of the present invention.

Figure 1:
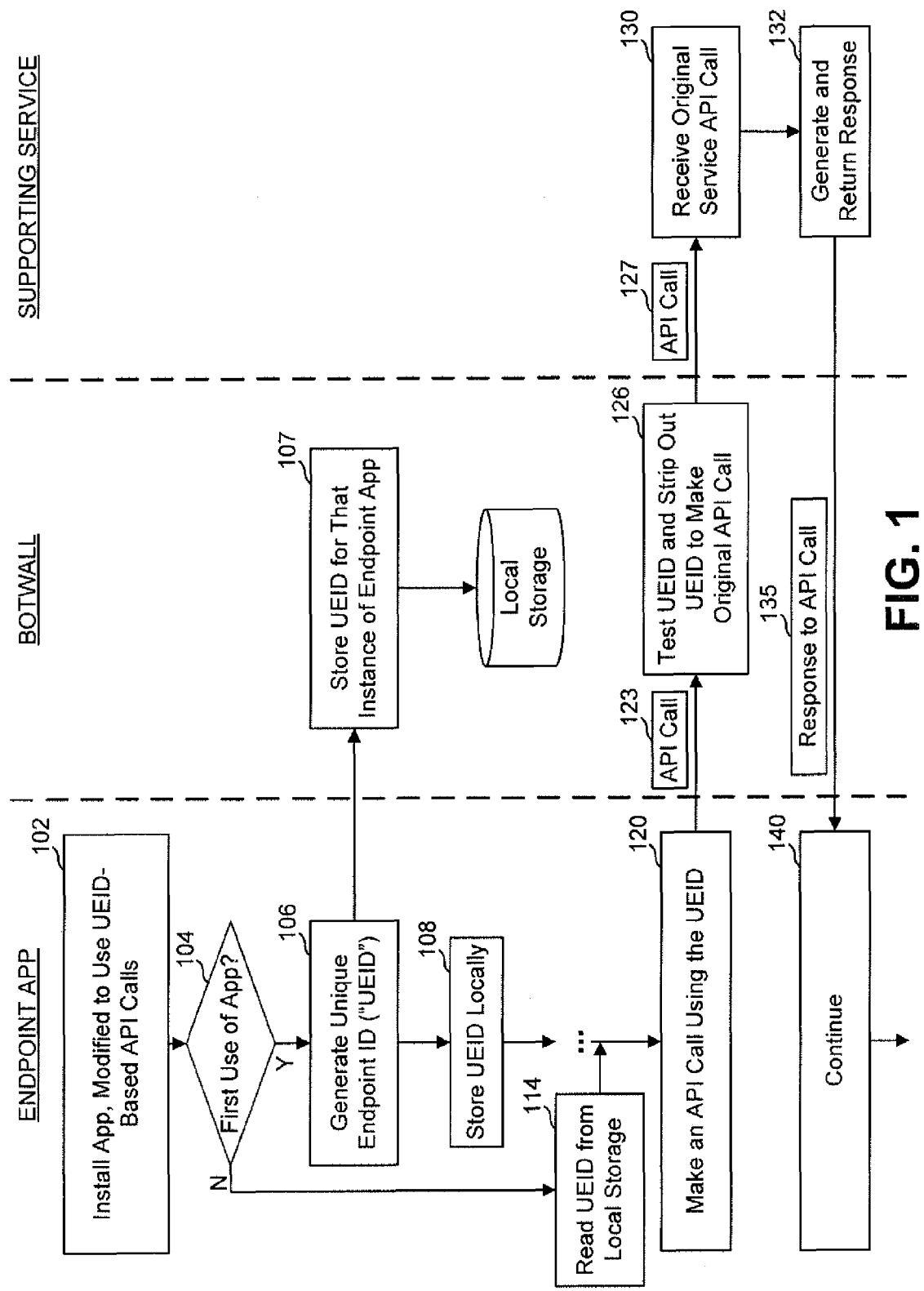
FIG. 1 is a swim diagram illustrating interactions of an example new app initialisation process.

In the figures, like reference symbols in the various drawings indicate like elements, and multiple instances of objects might be denoted parenthetically (e.g., 101(1), 101(2), ..., 101(n)). Where numbered objects in figures are shown with parenthetical sub-numbers ranging from 0 or 1 up to some letter designation (e.g., "1, 2, ..., k" or 1, 2, ..., n"), it should be understood that the letter designation represents some finite number the value of which is not essential for the understanding of the invention, unless otherwise indicated.

DETAILED DESCRIPTION

Network resources might include information, financial value, computing resources, or the like. For example, online-stored e-mails, online-stored personal photo, bank accounts with online transfer capability, online shopping services, computing power, etc., are all forms of network resources.

Network services might include uploading data, downloading data, interacting with server-side programs over a network, access to physical resources (e.g., printers, cameras, other equipment, etc.), communication services, or similar services that might be provided over a network. Network services might be provided by an HTTP server coupled to a back-end data processing system, or the like. Other network protocols might be used, as appropriate.

The network can be the Internet, an intranet, an extranet, a LAN, WAN or similar network that connects computers/devices/systems at network nodes to at least some other network nodes, thereby allowing users to use the network services.

As used herein, at least for the sake of readability, participants in a transaction might be referred to as a "user" and a "network service provider" but it should be understood that these labels might sometimes refer to humans or computers as users and/or persons, business groups, organizations, etc. as network service providers, even though specifically and technically it may well be that an electronic device operated by, or at the behest of a user is what is doing the interaction and the interaction is with computer/electronic hardware operated by, or at the behest of, a network service provider.

Electronic user devices might include computers, tablets, wearable computer devices, smartphones, embedded computer systems, or other devices.

Also, for the sake of readability, explanations are provided in the context of a user/user device running an "app" that interacts over the network with a server where the app and the server are coordinated such that the way the app interacts with the server is at least familiar to the server and vice versa. Unless otherwise indicated, the app can be a program running at the user device in user space, in system space, in browser space, etc. and can be a simple or complex program with a general or specific purpose. Thus, the "app" designation herein is not, unless otherwise indicated, limited to specific types of programs.

Most often, network resources are constrained so access to those network resources should be limited to those users and user devices that are authorized to access those resources and mechanisms would be used to block unauthorized access to those resources, or at least thwart unauthorized access enough to make it uninteresting to those persons or organizations that would attempt unauthorized access. Common examples of network resources that are constrained might include a messaging (e-mail, text, etc.) server that sends, stores, retrieves messages, some of which are not intended to general viewing, or an online banking application that might provide access to confidential financial information and the ability to transfer funds or obligate an account owner in some way.

One approach to this dichotomy—one that makes it easy for authorized users to get in and access those network resources, but makes it hard for unauthorized users to do so—is to make it so that both authorized users and unauthorized users have to manually interact with the security system that protects a network resource. For example, a webserver and system that allows users and user devices to initiate transactions to transfer money, purchases, or other markers of value from the system operator to the control of the initiator will want to control access. As a specific example, an online clothing retailer might allow anyone to shop online and cause products to accumulate in an online "shopping cart" but then before the transaction is consummated, the user is authenticated, necessary financial details are made, and the user is requested to pass a Turing test (such as a CAPTCHA test), to thwart attempts to automatically attempt to purchase goods using a large number of purloined username-password pairs.

While in some cases this is an easy feature to provide, in other cases it is not so straightforward. For example, where there is direct user interaction, the user interface can be such that it requires a human user to interact with the user interface in order to accomplish a task. While that might be good for thwarting automated attacks, it would also block legitimate automated actions. Moreover, introducing additional steps that require user interaction may discourage legitimate users, which can decrease the usefulness of the service offered and often directly impact the revenue of the service provider.

Suppose a bank provides a way for friends to transfer small amounts among themselves and that way is to have each person call a call center and describe the details of the desired transaction to a call center operator. That is likely to be infeasible. It is more feasible to have the transaction done entirely by the user interacting with a computer system, such as a website that allows users to transfer small amounts of money. Since it is expected that individual users would manually be accessing the website (and that unauthorized organizations would attempt automated programmatic access to the website), by only allowing direct website interfacing, the unauthorized access can be made more difficult (and thus less cost-effective).

This works well, until users and network resource managers decide that they want to allow for some interaction that is not manual. For example, suppose five friends are playing an online poker game for real money. When one friend wins a hand, the others would transfer some small amount to the winner. If the only way to transfer funds is for pairs of players to manually interact with the network resource that manages the funds transfers, this can be cumbersome. At the end of each hand, the players would stop, look at the online poker game program to determine how much they won/lost and to whom, and then look to a financial transfers program to make the corresponding transactions.

Rather than require each of the players to manually navigate a money transfer program interface each hand, the online poker game might handle that process directly by sending commands to indicate transfers after each hand. Typically, this might be done using an application programming interface ("API"), wherein non-human programs are given a structure to create interactions with the network resource in expected and authorized ways. But then this may then create a problem with unauthorized automated network access.

In some ways, it might be easy to describe transactions and interactions that are legitimate and those that are not legitimate. For example, a transfer of 25 cents every few minutes from Alice's poker funds account to Bob's poker funds account might be a legitimate set of transactions. Carol attempting to log in to her poker funds account three times might also be a legitimate set of transactions. Attempted transfers of $100 every fifteen seconds would not be a legitimate set of transactions for an online poker game among friends, nor would logging in to the poker system using Carol's credentials and trying 10,000 possible passwords.

Some times this filtering is hard and sometimes it is easy. One aspect of filtering that would make it easier to separate the authorized accesses from the unauthorized accesses is to identify and flag behaviors that seem unauthorized. This has been done extensively in the credit/debit card market, where card issuers have automated systems that study patterns to detect potential fraud. This would prevent a criminal from stealing a credit card from someone who only uses the card to buy groceries once a week and using that credit card to buy expensive jewelry twice a day. Obviously, the simplest computer program can flag that fraud and block the jewelry purchases. Unfortunately, criminals and especially sophisticated criminal organizations know this and have found ways to work around those blocks.

A criminal organization might purchase a dataset of a large number of credit card numbers and then automate the use of each credit card for a small purchase (that might later be converted to cash in the hands of the criminal organization) and get around fraud protections. As explained herein, those situations can be dealt with by having some limited resource that does not appear limited for authorized users but does appear limited for unauthorized automated attackers. As an example, each device that is connected to a secured network resource might be allowed a set number of accesses in a time period (e.g., 20 accesses per day per device, 1 access per five minute period, etc.). Unauthorized user devices that are relying on automation to make millions of accesses per day would be blocked.

Unfortunately, again, criminal organizations know this and might route around the blockage by having the unauthorized user device falsify information sent to the network resource so that the network resource sees a million accesses as coming from a million different user devices.

This document describes systems and techniques for weakly or strongly identifying specific end-user devices and their interfaces, despite the knowledge known to the attackers, and thereby thwarting attacks. In particular, attacks mounted by unauthorized users and/or their devices using automated programs to replace human interaction with programs/apps (commonly referred to as "bots").

FIG. 1 is a swim diagram illustrating interactions of an example new app initialization and use process for an endpoint app. In this example, the endpoint app is assumed to be an application installed on a user device such as smartphone or tablet. Examples of user devices include smartphones or tablets running the iOS™ operating system or the Android™ operating system and can include devices that obtain apps solely through a centralized repository of apps as well as those that obtain apps through other channels. The endpoint app might be obtained directly from a user operator or might be obtained from a centralized repository of apps. Examples of centralized repository of apps include the App Store™ app repository operated by Apple Computer and the Google Play™ app marketplace.

In step 102, the endpoint app is installed. The endpoint app in this example is modified to add uniquely identified API calls, such that the API call identifies the particular instance of the endpoint app. In other variations, those uniquely identified API calls might be native, built-in, and/or preexisting rather than modified. Where the endpoint has an original (non-unique API call protocol) API and a modified, uniquely identified API call protocol API, it may be that the necessary modifications occur by changing a library used by program code, such as a library linked at compile time. As explained later in this example, since endpoint app and an API call filtering system (herein, a "botwall") are configured such that each user device is initialized with respect to the botwall before the endpoint app provides original intended functionality, this can happen when the app first starts executing.

In step 104, the user device (or operating system or other code executing on the user device for this purpose) determines whether the endpoint app has been used before or if this is the first use of the app. If so, flow proceeds to step 106. It may be that the endpoint app has been used before, but perhaps on a different hardware platform or it was deleted and restored, but in some of those cases, the endpoint app is treated as not having been run before.

In step 106, the endpoint app or the user device generates or obtains a unique endpoint identifier ("UEID") 105 to be associated with that instance of the endpoint app. Various subprocesses for generating UEIDs are described hereinbelow. Once generated, the UEID 105 is transmitted to the botwall (step 107) as well as being stored local to the user device (step 108). Once this initialization process is complete, the user device has a UEID to associate with that instance of the endpoint app (and that UEID might persist across changes of user device, IP address, configurations of hardware, etc.) and the botwall has the UEID associated with that instance of the endpoint app.

In some variations, the UEID is created at the botwall upon request by the endpoint app or the user device and the UEID is sent from the botwall to the user device. In those variations, the user device need not send the UEID to the botwall as the botwall would have retained a copy. In some embodiments, the UEID is sent as a secured payload so that interlopers cannot discover it or alter it to their benefit.

In this example of FIG. 1, it can be assumed that the user device has not previously run or initialized the endpoint app, or has been reset, wiped, or reconfigured to appear to have not previously run or initialized the endpoint app. It should be understood that the installation/use of the example endpoint app described in detail can be independent of the installation/use of other apps on the user device. While some user devices might be configured to execute one and only one dedicated app, other user devices might be configured to run as many apps as the user choses, subject to storage constraints.

Subsequent API operations between the endpoint app and the web service are tagged the UEID. The API messages are intercepted by the botwall and if the UEID is valid it is striped from the message and then message is forwarded to the original web service or supporting server, as will be explained with the flow proceeding to step 120. If the endpoint app is installed and it is determined that the endpoint app has already been initialized, flow passes to step 114, where the UEID is read by the endpoint app (and/or its library) and flow passes to step 120.

By personalizing the API for each endpoint, by requiring the UEID be appended for each API call, the botwall can count the number of API calls from each unique endpoint. For example, a dozen attempts to authenticate from one endpoint during one day might be normal, but a thousand is clearly not an appropriate use of a single endpoint and is most likely and iterative kind of attack. The count of legitimate and the illegitimate uses of API calls are likely to differ by orders of magnitude. To protect the UEIDs from being reasonably guessed by the attacker, the UEID protection could be based on probability (i.e., a large random number).

At step 120, when the endpoint app initiates an API call request 123, it makes the call using the UEID as one of its arguments and sends it toward the botwall and/or the supporting service). The botwall in turn will test the UEID for validity, log the UEID and API call request, and strip out the UEID to form a different API call request 127 that is sent towards the API supporting service. Where the botwall tests the UEID for validity and finds that it is not valid, determines that the API call volumes for the UEID are above a threshold between normal use and unauthorized use, or the like, the botwall can block, drop or alter the API call request. In some cases, API call request 127 is identical to API call request 123, but in preferred implementations, API call request 127 is not UEID-specific and API supporting services that are UEID-unaware will process API calls correctly. In some implementations, exceeding a permitted API call volume would trigger the botwall to delete the associated UEID from the botwall's list of valid UEIDs.

If the botwall does pass API call request 127, the supporting service (such as a set of servers programmed to support a particular API, using HTTP or other protocol) would receive the API call (step 130) and field the API call by generating and returning (step 132) the appropriate call response 135 to the endpoint app, which would then continue processing as programmed (step 140). This process would be repeated as often as needed.

Figure 2:
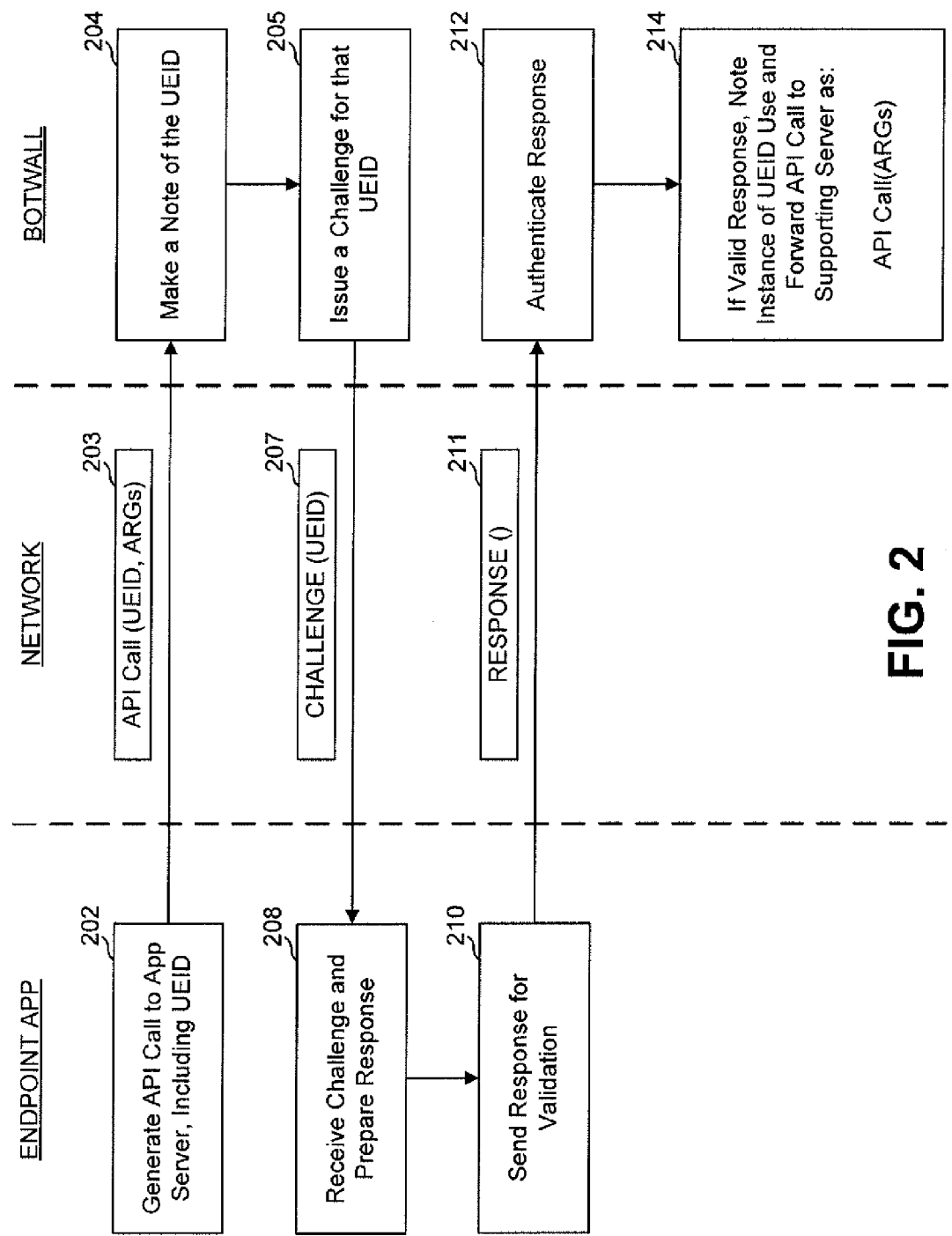
FIG. 2 is a swim diagram illustrating interactions of an initialized app running on an endpoint computer system and a server servicing API calls for that app.

FIG. 2 is a swim diagram illustrating interactions of an initialized endpoint app running on an endpoint computer system (such as a user device) and a supporting server servicing API calls for that app with additional steps. As the user device is executing the endpoint app, the endpoint app's program code might reach a point where the endpoint app wants to make an API call toward the supporting server, where it will be intercepted by the botwall. Alternatively, the endpoint app might direct all API calls directly to the botwall. The endpoint app would then generate the API call (step 202) and send an API call request 203 to the appropriate place (in FIG. 2, this is illustrated as being the botwall, but it could be otherwise). API call request 203 would include the UEID as well as any arguments required by the API call.

Once the API call request is received by the botwall, the botwall makes a note of the UEID (step 204) and then issues (step 205) a challenge message 207 to the user device/endpoint app. One purpose of this challenge message is so that the botwall can authenticate that the user device is the device associated with the proffered UEID. The user device receives the challenge message (step 208), prepares a response message 211 and sends the response message 211 to the botwall (step 210). The response message 211 is such that it contains information that could not have easily been generated apart from the endpoint app that is associated with that UEID.

The botwall then authenticates the response message (step 212). If the response is valid, thus indicating that that endpoint app is indeed associated with that UEID, the botwall notes (step 214) the instance of use of that API call with that UEID and forwards the API call (possibly with the UEID still included, or removed) toward the supporting server. If at step 214, the botwall determines that the UEID is not valid, the botwall can choose not to reply to the API call request.

In other variations, the API supporting server and botwall are more tightly integrated, such as being on the same machine or using intermingled code. However, this may require modifications of the API supporting server. For example, the filtering process for API calls could be built directly into the supporting service system.

In the manner described above, API calls, even though automated, can be limited. For example, it might be acceptable to accept up to ten login/authentication API request messages related to one user device in a short period of time, but it typically not acceptable to field tens of thousands of login/authentication API request messages from a given user device.

In a specific embodiment of a botwall, the challenge is a random number generated by the botwall that the endpoint app (or user device) then encrypts using a private key of a public/private key pair associated with that UEID. The response is sent to the botwall, which then decrypts the challenge response using the previously stored public key of the UEID/app. If the decrypted challenge response includes the random number that the challenge message included, as well as the correct UEID, the botwall should be able to safely assume that the correct endpoint app/user device performed that action, as the private key should only exist in the context of that endpoint app. If the endpoint app/user device fails the challenge, the botwall might just discard the rest of that transaction.

Even if the challenge response is successful, since the botwall has the UEID for each API call that uses these features, transaction volume can be measured and where a rational rate is exceeded (e.g., a rate that would be allowed for ordinary users), the botwall might drop that API call and delete/forget the UEID and its associated public key, thus invalidating future UEID-based API calls from that endpoint app (until a new UEID is generated at least).

In some variations, not all API calls are required to include the UEID, but where it is included, the botwall can easily correlate transaction requests with UEIDs. The botwall can do this even while user device fingerprints change (e.g., when one user gets a new user device, a device is restarted, when an IP address changes, etc.).

Of course, some determined hackers could delete the app, redownload it, and start the initialization process, thereby getting a new UEID. Since a legitimate user might only get an additional new UEID when purchasing a new user device, limits on the frequency or volume of new UEIDs would not burden legitimate users, but would thwart hacking attempts that use a small number of devices to make a large number of API calls and try to bypass the speed controls, as the hacking attempt would involve attempts to generate many orders of magnitude more UEIDs than are legitimately needed.

To block unauthorized access by an unauthorized person while not encumbering legitimate users of an API service, a threshold might be set for the number, frequency, location, etc. of new UEID registrations. The threshold does not need to be fixed, or exact, as the difference between the two cases is typically quite wide.

A typical credential stuffing attack might take 1,000,000 username-password pairs, known to work on other web sites, and test them on the target of interest in an attempt to discover where the credentials have been reused. Whereas a typical accidently incorrect password entry by a legitimate user might result in less than ten tries of username and password, the attack needs at least thousands of iteration to be minimally effective. As explained herein, one approach of prior art might attempt remediation by applying rate limits on the IP address. For example, once an app server receives 100 login attempts from one IP address the app server can block all further traffic from that IP address or endpoint device. Without more, this might also block legitimate users (suppose the IP traffic from hundreds of legitimate users is routed through one IP address such as occurs in the office environment of a large company) and further this approach might allow attackers to pass, if they route their traffic through multiple proxies to make it appear that one device is actually many different devices. Another approach of prior art is to limit rates associated with a device "fingerprint" which is certain properties about the device such as the type of browser, operating system version, clock skew, etc. The outcome is the similar to rate limiting by IP address, attackers simply alter the fingerprint to other obviously valid permutations.

As explained herein, to prevent (or at least encumber) a hacker from spoofing the botwall to hide the fact that a large number of user credential uses are coming from the same endpoint app, endpoints are uniquely identified. To prevent (or at least encumber) a hacker from responding by having endpoints generate new UEIDs for every iteration of the attack or for every few iterations, the UEID generation process can be tied to some subprocess that works well for small numbers, but not well for large numbers.

One example of such a subprocess is to tie the UEID generation to a specific IP address. This can be a soft barrier. Suppose that each time some user device sends in a new UEID and public key pair, the botwall records the IP address from which the request came. That way, if volumes exceed rational rate thresholds, then requests from the associated IP addresses might be subject to additional scrutiny for a time period, or a non-automatable step is imposed on the user.

It might be that the botwall includes a non-automatable step for every UEID generation. While this would add an extra step even for legitimate users, they would not see that extra step that often, perhaps only when switching to a new user device. That non-automatable step might involve a web page that is configured to block/frustrate automated interaction with that web page.

In another approach, the botwall performs an in-band or out-of-band step that makes use of an address space limited domain. As an example, a user's telephone number can be verified by an out-of-band process or non-automatable step. If the botwall required each request for registration of a new UEID to include the UEID, the public key, and a valid telephone number in the custody of the user, the app server could verify that telephone number by sending an SMS message to that number, placing an IVR call to that number, etc., and waiting for a user response.

The app server need not be hardcoded to reject multiple requests from the same telephone number, as that might typically happen when multiple legitimate users are sharing a telephone number or a user gets a new user device without a new telephone number. However, the app server can be coded to reject large numbers of requests from a given telephone number. Since a criminal organization performing some network attacks via an automation of API calls would likely need to execute a large volume of API calls (in part to account for a very low hit rate), they would be blocked from large scale automation in part by the fact that telephone numbers comprise an address space limited domain (in particular, the address(es) available to the attacker). Thus, with UEID registration requests each being correlated with a verifiable telephone number, attackers might not be able to obtain enough telephone numbers to produce sufficient different UEIDs to allow the attackers to run sufficient number of automated iterations. Telephone numbers associated with excessive iterations might be temporarily or permanently black-listed.

Tying the registration of new UEIDs to the possession of a telephone number creates a supply problem for the attacker, but not the legitimate user. This is because all legitimate users possess telephone numbers in sufficient quantity to register for any rational use. All attacks relying on iteration are deficient, by orders of magnitude, a sufficient quantity of unique telephone numbers to create valid registrations. The tying of registrations to telephone numbers could be implemented in one or more of several ways. For example, the registration might involve an IVR telephone call to the user wherein the app server sends the user an access code over the network channel and prompts the user to enter that access code into the telephone. The app server might just request any response, which would block attackers that are not able to feasibly receive and respond to tens of thousands of telephone calls.

As explained herein, in effect, the API usable by each user device is personalized to that user device and automating volume requests that should not be in volume are filtered out because too many come from one UEID/user device. If there are limits to the rate at which UEIDs can be created, then it can become infeasible for an attacker to bypass the filtering by rapidly changing the UEID or spoofing it. Thus, by personalizing each API, the attacker cannot run sufficient iterations though one API case or find/generate enough API cases to support the iterations required for a successful attack.

This can be used apart from, or in combination with, polymorphic object code procedures.

An API iteration attack relies on high iterations of a machine-to-machine ("M2M") API. Since it is often a simple matter to reverse-engineer and understand an M2M API interface, the attacker can masquerade as any expected device/application simply by exhibiting the correct behavior while exercising the API. Because of the use of Wi-Fi for mobile device communication, and other reasons, IP addresses alone might not be a useful way to identify real mobile devices. However, a typical attack that expects to create value by exercising an API iteratively will need millions of iterations to scale to the point where it can be sufficiently monetized to justify the attention of criminal enterprise and to produce losses worth mitigating. Through a combination of limiting the number of API calls from one user device and limiting the number of UEIDs that can be assigned, this attack is likely rendered infeasible.

The initialization process could be transparent or semi-transparent to the user. For example, once the user installs an app that is protected with the personalized API, and runs the app for the first time, the endpoint app can obtain the UEID and verify the smartphone's telephone number, all without user interaction. A message to the botwall might be in the form of an SMS sent via commonly available API's for smartphone apps. Short messages are correlated to network part of the transaction and the telephone number of the user device can be obtained from the inbound SMS header.

Where it is possible to spoof the telephone number in the SMS header, added security might be provided by having the botwall sends a challenge number via SMS to the telephone number provided. Using the SMS API, the endpoint app can capture this number and send it back to the app server. This might use a type 0 SMS (silent) message so not to disturb the user.

In other variations, a transparent wrapper is used to wrap native app object code with more object code and intercept outbound socket connections. That connection might be directed to a botwall. Anti-automation protocol is settled first and then traffic is routed from the botwall to the web service, which sees the API as it was previously expected. In yet other variations, the native app developer incorporates a library instead of wrapping object code. In some variations, there is a separate endpoint app for handling the processes of initialization and/or personalization and the native app calls that separate app. This might allow for more than one protected native app to share a single validation/registration, as well as correlating behavior over multiple apps.

Where the user device is a desktop computer, tablet, or the like, that does not have an assigned telephone number, the same approach could be taken by correlating with any telephone number in the possession of the endpoint app user, perhaps by the IVR method described herein, separate from the user device.

For publicly exposed APIs, an anti-automation library might be provided to the API user to do the endpoint device side part of the API personalization problem. Registrations might then be handled by a special web page flow on the API provider's site and may also correlate registrations with any telephone number using the IVR method.

For some web sites that cannot accommodate other defenses, the personalized API methods and apparatus described herein might be used where the UEID is generated at on a specific web page created to block automation and then the UEID is validated on all subsequent web pages.

Figure 3:
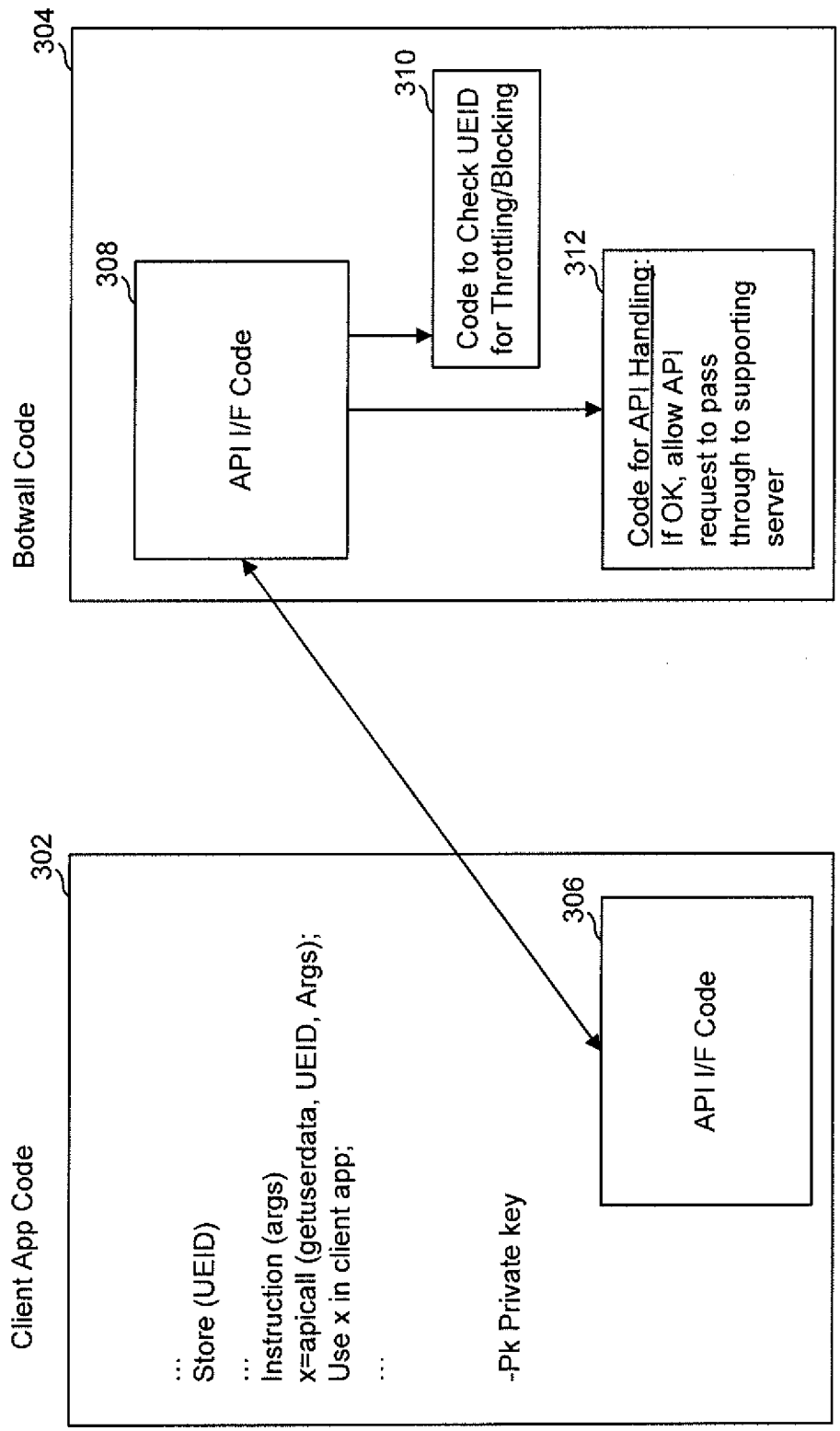
FIG. 3 is a block/functional diagram illustrating several components of program code that might interact to handle API servicing.

FIG. 3 is a block/functional diagram illustrating several components of program code that might interact to handle API servicing. FIG. 3 shows endpoint app code 302, as might be executed by a user device, app server code 304, as might be executed by, or as part of, a web server or other app server, with endpoint app code 302 including API interface code 306 and server app code 304 including API interface code 308. The API interface code portions 306, 308 might interact with each other over the Internet.

As illustrated in FIG. 3 and elsewhere, endpoint app code 302 includes functionality to obtain and store a UEID for the user device that is executing endpoint app code 302. During execution, when the user device's processor encounters an API call (illustrated in FIG. 3 as "x=apicall(getuserdata, UEID, ARGs)" as an example), that code calls API interface code 306, which in turn performs one or more of the processes described herein to interface to the botwall. Once the apicall( ) function returns a value or values from the supporting service, the endpoint app can use that information.

App server code 304 might include separate code sections for code 310 to check UEID usage and apply throttling as deemed appropriate, and code 312 for API handling if code 310 allows an API request from an endpoint device to pass.

Figure 4:
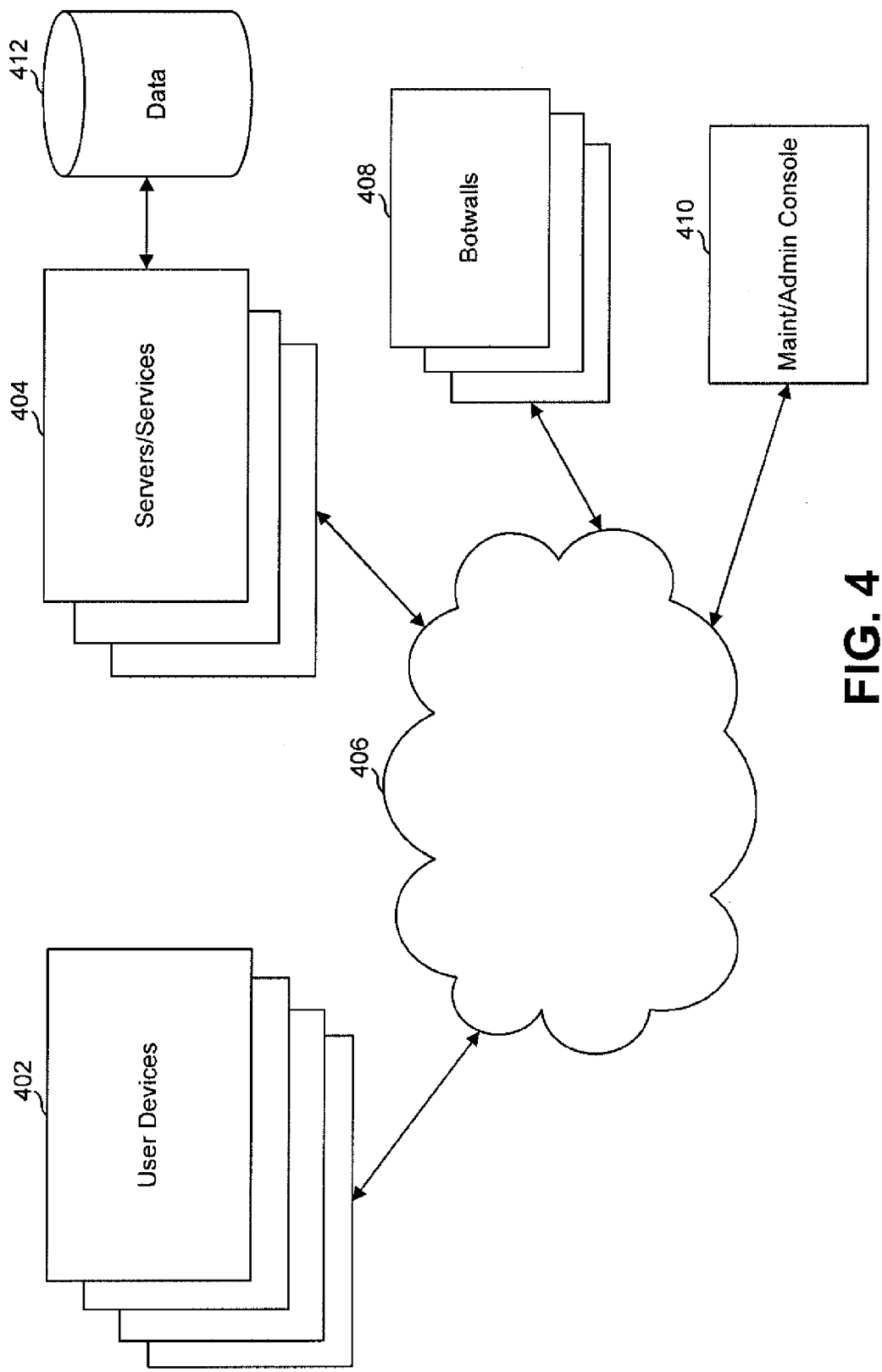
FIG. 4 is a block diagram of a networked computer system in which the processes and elements of FIGS. 1-3 might be used.

FIG. 4 is a block diagram of a networked computer system in which the processes and elements of FIGS. 1-3 might be used. As illustrated there, a networked computer system 400 comprises one or more client/endpoint/user devices 402 operated by users (and some attackers, possibly) to interface to one or more API supporting servers 404 via a network 406. Networked computer system 400 includes at least one botwall 408 and a maintenance and administrative console 410, each of which might be able to communicate via network 406. Servers 404 might be coupled to data stores 412. In another variation not shown, botwall 408 and server 404 are connected such that all traffic to and from server 404 has to pass through botwall 408.

Figure 5:
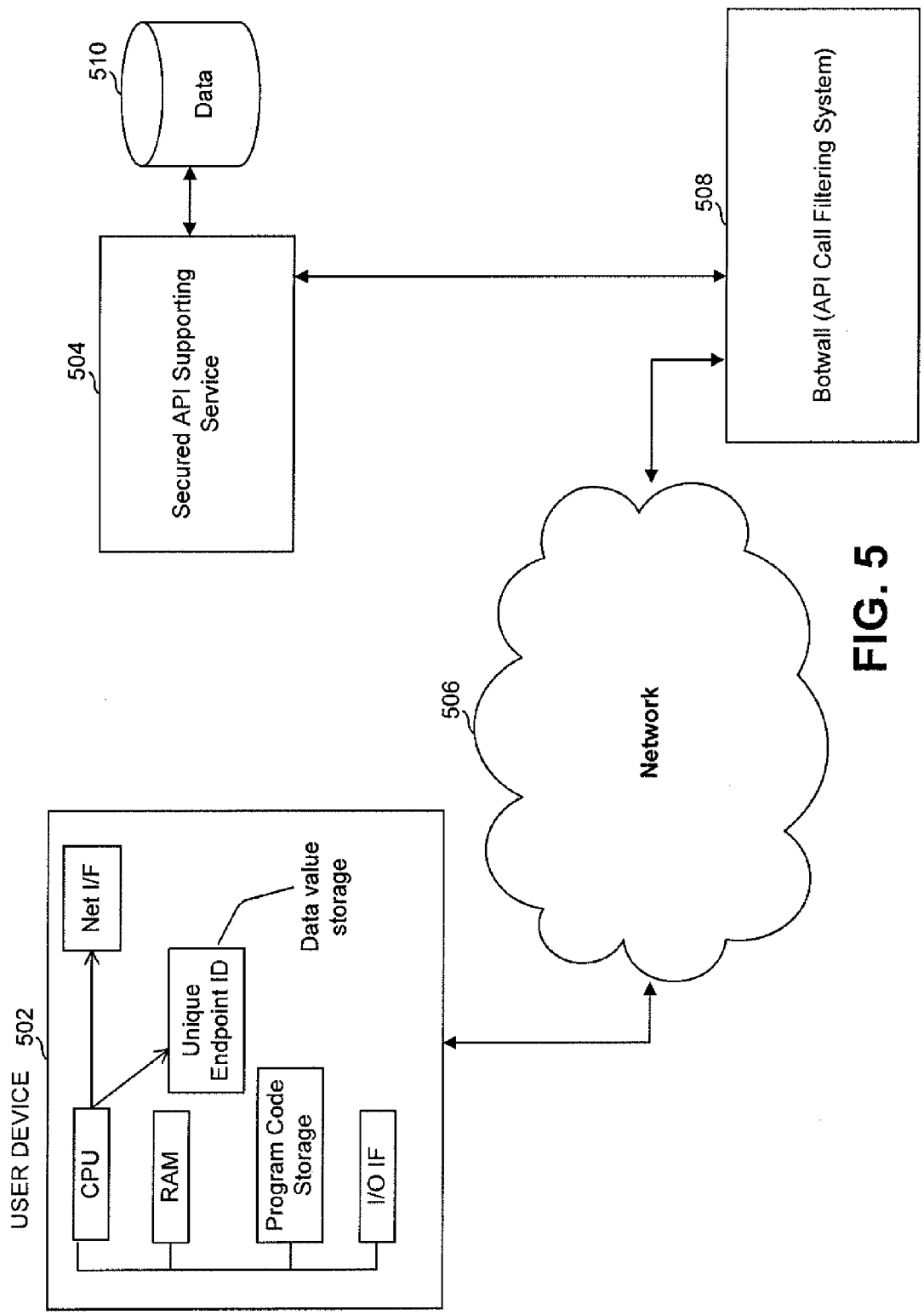
FIG. 5 is a block diagram of parts of FIG. 4 shown in greater detail.

FIG. 5 is a block diagram of parts of FIG. 4 shown in greater detail, but for only one endpoint device and one supporting server. As shown there, an endpoint device 502 communicates with a secured API supporting service 504 that is secured against a high-volume automated API attack using methods and apparatus described herein, and also communicates with a botwall 508. The communication shown is via a network 506, but additional paths, as explained elsewhere herein, might be used. Secured service 504 might provide endpoint device 502 with access to data store 510 and/or other networked resources.

A user device or app server, etc. might include various components. For example, a user device might comprise a central processing unit ("CPU"), random access memory, storage for data values such as a private key and an UEID, a network interface and an input/output interface. A system bus might connect the various components.

Typically, the CPU capable of processing instructions for execution that it reads from program code storage, which might be RAM, ROM, flash, magnetic storage, etc. The CPU may be designed using any of a number of architectures, such as a CISC (Complex Instruction Set Computer) processor, a RISC (Reduced Instruction Set Computer) processor, or a MISC (Minimal Instruction Set Computer) processor. The CPU might be a single-threaded processor or a multi-threaded processor. Additional functionality might be provided by a graphics I/O system and processor.

In some implementations, the memory used is a computer-readable medium, such as a volatile memory unit or a non-volatile memory unit. Various storage devices might be capable of providing mass storage for various needs. For example, in one implementation, storage devices comprise flash drive devices, floppy disk devices, hard disk devices, optical disk devices, tape devices, or the like.

Input/output devices might include a keyboard and/or pointing device and a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device.

A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data. Storage devices suitable for tangibly embodying computer program instructions and data include many forms of non-volatile memory, including, by way of example, semiconductor memory devices, such as EPROM, EEPROM, and flash memory devices, magnetic disks such as internal hard disks and removable disks, magneto-optical disks; and CD-ROM and DVD-ROM disks.

The processor and the memory can be supplemented by, or incorporated in, ASICs (application-specific integrated circuits). To provide for interaction with a user, the features can be implemented on a computer having a display device such as a CRT (cathode ray tube) or LCD (liquid crystal display) monitor for displaying information to the user and a keyboard and a pointing device such as a mouse or a trackball, or a touchscreen, by which the user can provide input to the computer. Additionally, such activities can be implemented via touchscreen flat panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by some form or medium of digital data communication such as a communication network. Examples of communication networks include a local-area network ("LAN"), a wide-area network ("WAN"), peer-to-peer networks (having ad-hoc or static members), grid computing infrastructures, and the Internet.

Figure 6:
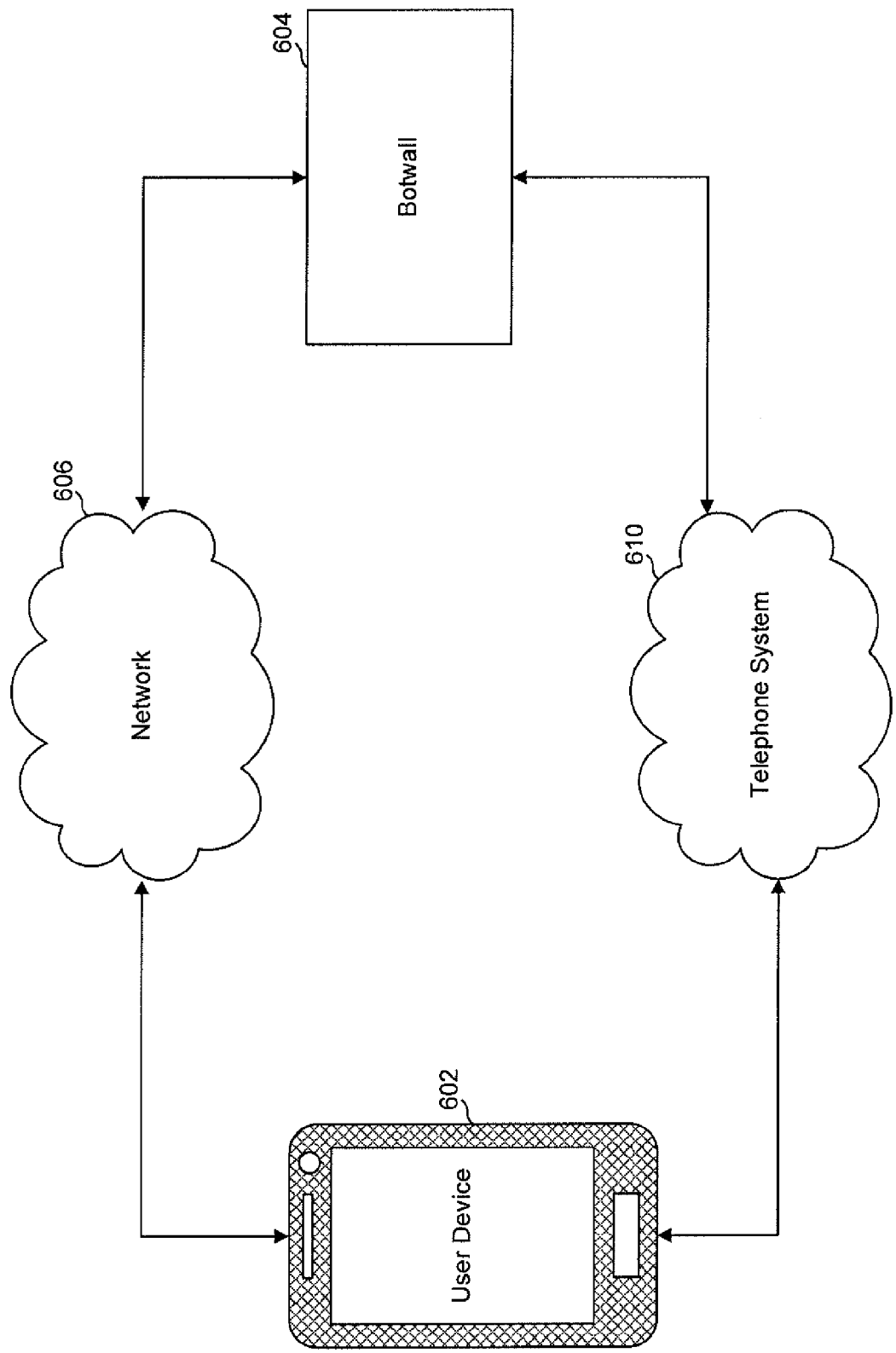
FIG. 6 is a block diagram of a specific arrangement, wherein an out-of-band, address space limited domain technique is used to make a high-volume API attack impractical, infeasible, and/or uneconomical.

FIG. 6 is a block diagram of a specific arrangement, wherein an out-of-band, address space limited domain technique is used to make a high-volume API attack impractical, infeasible, and/or uneconomical. As illustrated there, a user device 602 (such as a smartphone) interacts with a botwall 604 over a network 606, performing calls to an API served by botwall 604. Botwall 604 expects API calls to be personalized so that the user device (or some proxy of the user device) can be identified, so that botwall 604 can block calls that are beyond what a reasonable, legitimate user device would make. User device 602 might initialize itself to support a UEID and PKI pair through network interactions or through out-of-band interactions, such as a telephone call through telephone system 610.

The computer hardware described herein might be used with the computer software described herein unless otherwise indicated. The software can be written in one or more languages and be stored in different forms of memory or storage. The computer hardware described and illustrated might include various forms of digital computers, such as laptops, desktops, workstations, personal digital assistants, servers, blade servers, mainframes, and other appropriate computers.

The user device might include mobile devices, such as personal digital assistants, cellular telephones, smartphones, and other similar computing devices. Additionally the system can include portable storage media, such as Universal Serial Bus ("USB") flash drives. For example, the USB flash drives may store operating systems and other applications. The USB flash drives can include input/output components, such as a wireless transmitter or USB connector that may be inserted into a USB port of another computing device.

The computer system can include clients and servers. A client and server are generally remote from each other and typically interact through a network. The relationship of client and server arises by virtue of computer programs running on the respective computers and having a client-server relationship to each other. An endpoint device is a device that connects, in some manner, to at least one of the servers, directly or indirectly, to perform some end goal. Where one device is designated as an endpoint device, it may be that that endpoint device is a client in some client-server relationship, but it could also be a server in some instances and there may be intermediaries that are treated as client-server combinations.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other implementations are within the scope of the following claims. Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Further embodiments can be envisioned to one of ordinary skill in the art after reading this disclosure. In other embodiments, combinations or sub-combinations of the above disclosed invention can be advantageously made. The specification and figures are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. An API call filtering system that filters API calls received, via a network, from user devices that are network-connected and running endpoint app software and/or hardware, to secure an API service that accepts API call requests and provides API call responses thereto, wherein the API service is secured against excessive request iterations from a set of rogue user devices while allowing for ordinary volumes of requests of the user devices, wherein one or more boundaries between what is deemed to be an ordinary volume of requests and what is deemed to be excessive request iterations are determined by predetermined criteria, the API call filtering system comprising:
 memory for storing data;
 a processor that executes program code;
 program code for handling requests from user devices, the requests being requests received via a network interface from the user devices;
 program code for determining a unique endpoint identifier ("UEID") for a received request, and wherein the UEID is specific to a requesting user device that made the received request, wherein the UEID of the received request is determined, at least in part, from a personalized application programming interface ("API") processing of the received request;

storage for a plurality of references to user devices, the references being to their corresponding unique endpoint identifiers ("UEIDs");

program code for verifying with the requesting user device that it is the user device associated with the UEID included in the request from the requesting user device; and filter controller program code for dropping, filtering and/or forwarding requests wherein the filter controller program code operates, at least in part, by recognizing the UEIDs of the requests, wherein forwarding a request comprises sending a modified API call to the API service, wherein the modified API call is based on a received API call received from a requesting user device and wherein the modified API call is modified to conform to an expected API call format of the API service at least by omitting the UEID in the modified API call.

2. The API call filtering system of claim 1, wherein requests from user devices include requests to authenticate the user device with respect to a secured account maintained at or for the API service.

3. The API call filtering system of claim 1, wherein the program code for verifying includes a public key module that can encrypt a challenge message using a public key of a public key pair associated with one or more UEIDs and check signing of challenge reply messages.

4. The API call filtering system of claim 3, wherein the challenge message includes a random, semi-random, or pseudorandom number.

5. The API call filtering system of claim 1, wherein one or more of the program code for handling requests, program code for determining the UEID for the received request, the storage for the plurality of references to user devices, the program code for verifying, and/or the filter controller program code are resident at, and/or executed by, the secured API service.

6. A user device that executes at least one endpoint app that sends API requests via a network to an API service that has been secured against excessive request iterations from a set of rogue user devices while allowing for ordinary volumes of requests from the user devices, the user device comprising:
   a processor;
   program code, executable by the processor, for processing data about, by, or for one or more endpoint apps that execute on a user device;
   storage for one or more unique endpoint identifier ("UEID"), wherein at least one UEID is associated with the one or more endpoint apps and the at least one UEID is specific to the user device;
   program code, executable by the processor, for responding to challenge messages challenging the UEID, wherein a response to a challenge message comprises information indicating that the response was generated using the one or more endpoint apps with which the UEID is associated; and
   program code for generating requests to be sent over the network to an API call filtering system and/or an API service while identifying the endpoint app in the requests using the UEID associated with that endpoint app, such that requests from rogue user devices can be distinguished from ordinary user devices and such that a request is modifiable into a modified request, wherein the modified request is modifiable to conform to an expected API call format of an API server at least by omitting the UEID in the modified request.

7. The user device of claim 6, wherein the one or more UEID is associated with a limited address space to reduce an ability of an unauthorized device to use multiple UEIDs in order to hide a source of excessive request iterations.

8. The user device of claim 7, wherein the limited address space is provided by association of UEID requests with telephone numbers.

9. The user device of claim 6, further comprising storage for a private key of a public key infrastructure ("PKI") key pair, wherein the private key used at least to encrypt challenge responses thereby signaling that the user device has access to the private key.

10. The user device of claim 6, wherein the requests generated by the program code for generating requests are requests directed to be sent over the network to the API call filtering system.

11. The user device of claim 6, wherein the requests generated by the program code for generating requests are requests directed to be sent over the network to the API service.

12. In a secured network environment, wherein a computing system that services application programming interface ("API") calls is connected to a network that allows for authorized user devices to initiate such API calls and also allows for unauthorized user devices to initiate such API calls, a method of detecting at least some unauthorized API calls, the method comprising:
   receiving, over the network, an API call from a requesting user device;
   identifying a unique end-point identifier ("UEID") of the requesting user device based on data provided with the API call, wherein the UEID is usable to distinguish the requesting user device from other user devices;
   checking the UEID against a stored plurality of references to user devices' corresponding unique endpoint identifiers ("UEIDs");
   verifying that the requesting user device is the user device associated with the UEID included in the API call from the requesting user device;
   filtering out API call requests, based on the UEID and its determined validity; and
   sending a modified API call that is based on the API call received from the requesting user device, wherein the modified API call is modified to conform to an expected API call format of an API server at least by omitting the UEID in the modified API call.

13. The method of claim 12, wherein filtering out requests comprises:
   determining a rule for distinguishing excessive request iterations from a specific user device from an ordinary volume of request iterations from the specific user device; and
   securing the API call requests against excessive request iterations from a set of user devices while allowing for ordinary volumes of requests from the set of user devices, wherein one or more boundaries between what is deemed to be an ordinary volume of requests and what is deemed to be excessive request iterations are determined by predetermined criteria.

14. The method of claim 13, wherein securing the API call requests against excessive request iterations comprises dropping requests using invalid UEIDs, dropping requests for a given UEID that are deemed excessive requests according to the rule, and forwarding requests deemed, according to the rule, to be for ordinary volumes of requests from valid UEIDs.

15. The method of claim 12, wherein at least one of the API calls authenticates user devices with respect to a secured account maintained by the API service.

16. The method of claim 12, wherein verifying comprises:
encrypting a challenge message using a public key of a public key pair associated with one or more UEIDs; and
checking digital signatures of challenge reply messages.

17. The method of claim 16, wherein the challenge message includes a random, semi-random, or pseudorandom number.

18. The API call filtering system of claim 1, wherein the filter controller program code filters based on predetermined limits assigned to represent excessive request iterations from individual UEIDs, wherein the predetermined limits comprise limits on total number of requests from an individual UEID or total number of requests from an individual UEID in a predefined period of time.

19. The method of claim 13, wherein determining the rule comprises a rule that distinguishes excessive request iterations from the ordinary volume of request iterations from the specific user device by comparing transaction value to a predetermined rate for allowable ordinary use.

20. A non-transitory computer-readable storage medium having stored thereon instructions executable by one or more processors of a computer system, the instructions comprising:
program code for receiving an application programming interface ("API") call, via a network, from a requesting user device of a set of user devices, wherein the API call received from the requesting user device comprises a current request of that requesting user device directed to an API server, and wherein the set of user devices includes user devices that are network-connected and running endpoint app software and/or hardware that make API calls to the API server;
program code for determining a threshold, for an individual user device, between normal use of the API calls to the API server and unauthorized use of the API calls to the API server;
program code for determining, from the current request, a unique endpoint identifier ("UEID") for the requesting user device, wherein the UEID is specific to the requesting user device and wherein the UEID of the current request is determined, at least in part, from a personalized API processing of the current request;
program code for verifying with the requesting user device that it is the user device that is associated with the UEID included in the current request;
program code for logging the UEID included in the current request;
program code for determining whether the current request and prior requests that included the same UEID as was included in the current request exceed the threshold;
program code for allowing the API call to reach the API server if the threshold is not exceeded;
program code for sending a modified API call to the API server that is based on the API call received from the requesting user device, wherein the modified API call is modified to conform to an expected API call format of the API server at least by omitting the UEID in the modified API call; and
program code for blocking the API call if the threshold is exceeded.

21. The non-transitory computer-readable storage medium of claim 20,
wherein the program code for blocking the API call comprises program code for dropping the API call without response to the requesting user device.

22. The non-transitory computer-readable storage medium of claim 20, further comprising:
program code for assigning UEIDs to user devices in the set of user devices, wherein one or more of the UEIDs assigned are associated with a limited address space to reduce an ability of an unauthorized device to use multiple UEIDs in order to hide a source of excessive API calls.

* * * * *